US006655736B1

(12) United States Patent
Arenas

(10) Patent No.: US 6,655,736 B1
(45) Date of Patent: Dec. 2, 2003

(54) RETRACTABLE SEAT PROTECTION COVER

(76) Inventor: George Gabriel Arenas, 13 Madeline St., Sharpsville, PA (US) 16150

( * ) Notice: Subject to any disclaimer, the term of this patent is extended or adjusted under 35 U.S.C. 154(b) by 0 days.

(21) Appl. No.: 10/011,839

(22) Filed: Dec. 3, 2001

(51) Int. Cl.[7] ............................................. A47C 31/11
(52) U.S. Cl. .................... 297/229; 297/184.11; 160/24; 160/305
(58) Field of Search ................ 297/219.1, 229, 297/184.11; 160/24, 305, 302, 301

(56) References Cited

U.S. PATENT DOCUMENTS

| | | | |
|---|---|---|---|
| 1,536,005 A | | 4/1925 | Housteau |
| 1,985,222 A | | 12/1934 | Menhall |
| 2,532,867 A | | 12/1950 | Toms |
| 2,804,914 A | | 9/1957 | Butko |
| 2,842,189 A | | 7/1958 | Gratt |
| 3,115,927 A | * | 12/1963 | Znamirowski ............... 160/301 |
| 4,118,066 A | | 10/1978 | Ricke |
| 4,320,922 A | | 3/1982 | Meritis |
| 4,600,238 A | | 7/1986 | Goodford |
| 4,676,376 A | | 6/1987 | Keiswetter |
| 4,723,814 A | | 2/1988 | Hunt |
| 4,790,592 A | | 12/1988 | Busso et al. |
| 4,883,701 A | * | 11/1989 | Rankin et al. ............... 428/136 |
| 5,029,819 A | * | 7/1991 | Kane ............ 256/24 |
| 5,036,898 A | * | 8/1991 | Chen ........................ 160/23.1 |
| 5,054,533 A | * | 10/1991 | Lii .............................. 160/302 |
| 5,078,198 A | * | 1/1992 | Tedeschi ..................... 160/315 |
| 5,205,332 A | * | 4/1993 | Lii .............................. 160/23.1 |
| 5,226,467 A | * | 7/1993 | Lii .............................. 160/302 |
| 5,330,251 A | * | 7/1994 | McGuire .................... 297/229 |
| 5,709,431 A | | 1/1998 | Horn |
| 5,806,925 A | * | 9/1998 | Hanley ........................ 297/229 |
| 5,813,449 A | * | 9/1998 | Patmore et al. ......... 160/370.22 |
| 5,829,828 A | | 11/1998 | Asfaw |
| 5,868,191 A | * | 2/1999 | Blackmon, Jr. ............... 160/31 |
| 5,969,588 A | * | 10/1999 | Nelson ........................ 335/229 |
| 6,053,572 A | * | 4/2000 | Doran ..................... 297/219.1 |
| 6,089,659 A | | 7/2000 | Toyota |
| 6,123,135 A | * | 9/2000 | Mathews ..................... 160/26 |
| 6,131,642 A | * | 10/2000 | Welfonder .................. 160/301 |
| 6,135,186 A | * | 10/2000 | Lindley, Jr. ................ 160/23.1 |
| 6,158,805 A | | 12/2000 | Blaney |
| 6,213,186 B1 | * | 4/2001 | Torres et al. ................. 160/24 |
| 6,241,188 B1 | * | 6/2001 | Simpson et al. ......... 244/122 R |
| 6,338,527 B1 | * | 1/2002 | Toyota et al. ............... 297/229 |
| 6,382,720 B1 | * | 5/2002 | Franklin et al. ......... 297/228.13 |
| 6,457,773 B1 | * | 10/2002 | Gates ..................... 297/228.12 |
| 6,491,332 B2 | * | 12/2002 | De Ceuster .............. 296/37.16 |

FOREIGN PATENT DOCUMENTS

JP          06197826 A   *   7/1994   ........... A47C/31/11

* cited by examiner

Primary Examiner—Peter M. Cuomo
Assistant Examiner—Stephen D'Adamo
(74) Attorney, Agent, or Firm—Aileen Champion Addessi

(57) ABSTRACT

A retractable seat cover for providing temporary protection to a seat, such as an automotive seat or piece of furniture, includes a housing, a roll of fabric, a retraction mechanism, and a strap. The housing has a slit for enabling the fabric to be extended from the housing through the slit or be retracted into the housing through the slit. The fabric, which may be waterproof, moisture repellent and/or have anti-bacterial properties for providing additional protection to the seat, is used to cover the upholstery of the seat. The retraction mechanism includes a spring roller mechanism and a button for controlling rotation of the roll of fabric. The strap is attached to a top portion of the fabric and is used to secure the seat cover to the seat, such as a headrest of an automobile or the top of a piece of furniture.

19 Claims, 3 Drawing Sheets

RETRACTABLE SEAT PROTECTION COVER

BACKGROUND OF THE INVENTION

The present invention relates to providing upholstery protection to seats, and more particularly, to a temporary storeable seat cover that utilizes a spring roller mechanism for convenient storage in a discrete housing that lends itself to aftermarket use.

Automotive seats are used to transport a wide variety of items including humans, pets, household items, groceries, etc. from one place to another. In doing so, these items inevitably carry a variety of contaminants in solid, liquid and microbiological form which can be transferred from the transported person or item to the surface of the seat. This contamination contributes to a variety of unwanted side effects which include odor, upholstery discoloration, stains, dampness and bacterial contamination. These side effects can lead to decreased car value, increased propensity for colds, and embarrassment for the car owner if significant contamination occurs over time. Because automotive seats can be expensive and make up a highly visible component of the overall vehicle, automobile owners have a vested interest in preserving the natural aesthetic beauty of the original seat. Most owners will tend to avoid covering the surface on a permanent basis due to a preference towards the aesthetic appeal of the original upholstery.

As an example of the need to provide a temporary seat cover, people involved in heavy exercise are frequently faced with the need to enter their car with perspiration soaked clothing, thus contaminating the surface of the seat with high doses of moisture from sweat which can lead to bacteria build up, odor and even staining of the upholstery over a prolonged period of time. Some people attempt to partially protect the upholstery surface with a clean or used towel which tends to cover only part of the surface, while others simply allow their sweat to be absorbed into the exposed upholstery. Use of a towel can be cumbersome to apply since towels do not carry an anchoring mechanism, and may be inconvenient and not practical due to the difficulty in storing a towel in an aesthetically appealing manner within the limited space of an automobile interior.

Also, following visits to the beach, individuals or families frequently find themselves returning to their vehicles with wet clothing and sand filled towels. These vehicle owners must face the challenge of driving and transporting passengers without soaking the seats or soiling them with sand. Many times, there are attempts to use recently used beach towels for protection, however these may be soiled or wet themselves in many cases, causing similar levels of contamination. Frequently, vehicle owners have no alternative but to allow their valuable upholstery to become soaked with moisture and sand.

There are a number of professions which cause a person to arrive at work in clean clothing and return from work with soiled apparel. Mechanics, farmers, professional athletes, construction workers and some blue collar professions are prone to this. These individuals can carry a wide range of grease, dirt and other contaminants which can leave a visible stain on their vehicle upholstery. Without using a temporary means of protection, the owner will continually leave increased levels of stains to the vehicle.

In hot weather climates, vehicle owners frequently must temporarily leave their vehicles in direct sunlight while accomplishing routine errands. After a prolonged period of time, the interior of the vehicle can become extremely hot to the point of discomfort. One of the hottest surfaces, particularly in dark interior vehicles, is the seat. Prolonged exposure to intense heat can cause damage to upholstery. Even worse, extreme heat levels can cause a passenger to get burned by the heated upholstery, particularly if wearing shorts that expose the skin to direct contact with the scorching fabric. Temporarily covering a dark seat with a light heat defracting fabric will allow a vehicle owner to remove the protective covering upon return to the vehicle and diminish the heat level that comes in contact with the driver or passenger. Pet owners who bring their pet along on periodic trips will tend to accumulate pet hair on upholstery over time which will have the propensity to get re-transferred onto a human passenger's clothing in the future. Pet odors also can get trapped within the upholstery causing unwanted odors for passengers.

U.S. Pat. No. 4,320,922 to Meritis proposes the use of the headrest as the storage mechanism for the seat cover. This concept limits the amount of fabric available for use to the width of the headrest, which is usually too narrow of a surface area to provide adequate protection to the exposed area of the seat. U.S. Pat. No. 4,600,238 to Goodford, U.S. Pat. No. 4,790,592 to Busso et al., and Meritis disclose factory installing the seat cover system. Although OEM applications offer some validity, they do not offer help to current car owners who may be in need of an after-market solution. Furthermore, it is uncertain whether vehicle manufacturers will be willing or able to apply similar OEM concepts across the wide breadth of available vehicles.

U.S. Pat. No. 1,985,222 to Menhall, U.S. Pat. No. 4,118,066 to Ricke and U.S. Pat. No. 2,804,914 to Butcko et al. suggest installation of an apparatus under the seat of a vehicle. Since automotive seat configurations vary so widely from manufacturer to manufacturer, it is unlikely that a single sized and shaped unit that is securely attached to a vehicles seat can be able to fit under the seat of a wide range of vehicles. Also, it is likely that installation under the seat would be either highly visible or interfere with the OEM mechanism for seat adjustment. Therefore, these temporary surface protection devices used as an aftermarket option, do not allow for universal fitting across a wide breadth of vehicles U.S. Pat. No. 4,676,376 to Keiswetter discloses utilization of a temporary cover that is intended for limited use and does not allow the user to re-store the cover temporarily for re-use. However, many vehicle owners will not find it convenient to carry and dispose of used covers on a frequent basis. For vehicle owners who need to apply temporary protection with great frequency, such as users with a regular exercise routine, they would find the need to discard a temporary seat cover cumbersome and may choose to abandon its usage.

U.S. Pat. No. 6,089,659 to Toyota has suggested the use of the headrest to secure the seat cover, but has not offered a temporary solution with discrete storability during non-use. Toyota discloses that the seat cover be attached to mounting bars of a headrest. However, mounting bars do not exist in all vehicles. U.S. Pat. No. 5,806,925 to Hanley has also suggested the use of the head rest as an anchor but has not provided the vehicle owner with a quick, clean method of collecting the material for temporary storage. Instead, a user is required to manually collect the protective seat cover for storage.

U.S. Pat. No. 5,829,828 to Asfaw discloses a seat cover having a housing for containing a retractable roll of material.

However, the housing is positioned between a back seat cushion and a bottom seat cushion and the fabric only extends to cover the bottom seat cushion.

Thus, there is an unmet need in the marketplace to provide a satisfactory form of short term protection to automotive seat upholstery

SUMMARY OF THE INVENTION

A retractable seat cover for providing temporary protection to a seat having a top portion includes a housing having a first end, a second end, and a longitudinal slit therebetween. A retraction mechanism is positioned within the housing and is rotatably attached to the housing. A piece of fabric has a top portion and a lower portion, the lower portion being attached to the retraction mechanism, and the top portion extending through the slit of the housing as the fabric is withdrawn from the housing during use of the retractable seat cover and retracting back through the slit when the retraction mechanism is activated to roll the fabric back into the housing during non-use of the retractable seat cover. A strap has a first end and a second end, which are attached in spaced apart relation to the top portion of the fabric and the strap is securable to the headrest or top portion of the seat for anchoring the retractable seat cover to the seat.

A principal object of the present invention is to provide a protective barrier to automobile upholstery which can be utilized on a short term as needed basis, allowing the user to preserve the value and aesthetic appeal of their automobile. The invention allows a user to enjoy the natural beauty of original upholstery material during periods when limited contamination potential exists, while at the same time providing easily accessible short term protection during periods of high exposure to contaminants such as sweat, dirt, bacteria and other pollutants.

It is a further object to make the invention as compact and concealable as possible in order to maximize its accessibility when needed, while at the same time avoiding detracting from the aesthetic appeal of the automotive seat and vehicle. In order to further encourage a compact configuration, the retractable seat protection cover incorporates the use of a spring roller mechanism which allows protective fabric to be maintained and made available utilizing minimal space. Use of a spring roller mechanism further allows enhanced ease of use since the spring serves to assist the user in high speed organized storage when removing the protective fabric cover when no longer needed.

The invention utilizes a housing whose object is to provide efficient storage capability to the invention which further encourages compactness and concealability. Aesthetic appeal and discrete storage is further enhanced by making the housing available in multiple colors which closely fit the colors of the upholstery to be protected and/or interior of the vehicle, thus creating a camouflage effect. The relatively narrow cylindrical shape of the housing provides ergonomic benefits and promotes ease of use by acting as a handle that conveniently fits in the palm of most users hands during the application of protective fabric. The housing is compact enough to fit comfortably under the seat of most vehicles in either a parallel or perpendicular direction. The housing is intended to be conveniently stored and secured if necessary. The housing can also utilize commonly available fasteners such as fibrous adhesive patches marketed under the tradename Velcro or hooks to secure the housing in place within the vehicle to add discreteness and/or convenience of storage.

The invention allows for universal fitting on substantially all makes and models of automobiles by utilizing an elastic band which easily stretches to wrap around the top of an automobile seat to conform to its size and shape. The top of an automobile seat has been found to be the one common denominator amongst all vehicles where sufficient space exists to allow satisfactory anchoring of fabric across a wide breadth of automobile configurations. The thickness of the elastic is minimized in order to decrease the visibility of the elastic when used to anchor the protective fabric to the upholstery. This contrasts other inventions which have intended to utilize the entire surface area of the head rest as an anchor mechanism. Head rest contamination has been found to be virtually non-existent since limited contact actually occurs with the head rest during normal transportation of people or objects. Thus, it is considered unnecessary and less discrete to utilize the entire surface area of the head rest as an anchoring mechanism. Use of a thin elastic band provides sufficient anchoring, without the use of unneeded fabric which may tend to make the seat cover more noticeable and less economical.

A roll of fabric is utilized as the protective barrier between a potentially contaminating body and the upholstery. The fabric offers sufficient surface area to adequately cover the seat surface so as to provide adequate protection to the upholstery. Although both woven and non-woven materials may be utilized in the invention, there is a tendency towards usage of non-woven fabrics to provide increased economic benefits due to manufacturing efficiencies that exist with non woven fabric. Non woven fabric also offer wider variety of thin layers which further promote compactness in the invention.

The fabric is intended to possess various properties which enhance the protective capabilities of the invention. Anti-bacterial technology can be utilized in and/or on the fabric to reduce the occurrence of odors and stains that may develop from prolonged bacterial contamination and promote increased sanitary protection. Anti-bacterial technology may be utilized by impregnating fabric with agents that discourage the proliferation of bacteria and other harmful organisms. The anti-bacterial protection also increases the usable shelf life of the fabric by inhibiting the growth of bacteria on the protective fabric itself.

Although numerous protective fabrics are available, there should be a tendency towards utilizing water repellent fabric on the top side of the fabric, furthest away from the upholstery surface. The repellent properties encourage moisture to remain on the surface of the fabric so that it can become absorbed by the carrying body. Upon leaving the vehicle, the moisture would remain on the carrying body and vacate the vehicle, thus maximizing the removal of moisture, dirt and other contaminants, reducing the amount of contamination maintained on the fabric and thereby prolonging its usable life.

In order to create a true barrier for upholstery the invention utilizes a thin waterproof coating on the side of the fabric which is in direct contact with the upholstery. This extra layer of protection serves as the final barrier to prevent moisture from becoming trapped in the upholstery, thereby eliminating the chance of odors and stains.

In addition to sanitary protection, the fabric also provides solar protection which is needed from time to time when automobiles are left exposed to direct sunlight for a prolonged period of time. Removal of the protective fabric will tend to maintain a cooler surface on the original upholstery surface than would otherwise exist if left uncovered and fully exposed. Ultraviolet protection is also possible, if fabric is used that provides UV protection that diminishes potential upholstery damage that can be caused by harmful UV rays. The degrees of solar protection will vary depending on the reflective and solar dissipating qualities of the fabric used.

The fabric is intended to be economical enough to be semi-disposable, allowing for multiple uses over a limited period of time. This avoids the need to constantly dispose of the fabric after every use, providing sufficient usage time to make the invention more practical. At the same time, after extended periods and uses where the protective fabric may have collected sufficient contamination to warrant its disposal, a user can conveniently and economically replace the roll of fabric with a fresh roll.

The roll is intended to be able to fit snugly around the spring roller in a manner that allows movement and control of the roller and its fabric to be controlled by the action of the spring roller. There are a wide array of methodologies available to secure the roll of fabric to the spring roller and include but are not limited to the use of multiple holes or notches engraved in the core of the roll which is prepared to receive the male counterpart which would be delivered from the edge of the spring roller mechanism. The purpose being to provide secure temporary adherence between the roll and spring roller so that smooth rotation of both components will tend to operate as one unit in a fluid rotational motion.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

DETAILED DESCRIPTION OF THE PREFERRED EMBODIMENT

Figure 1:
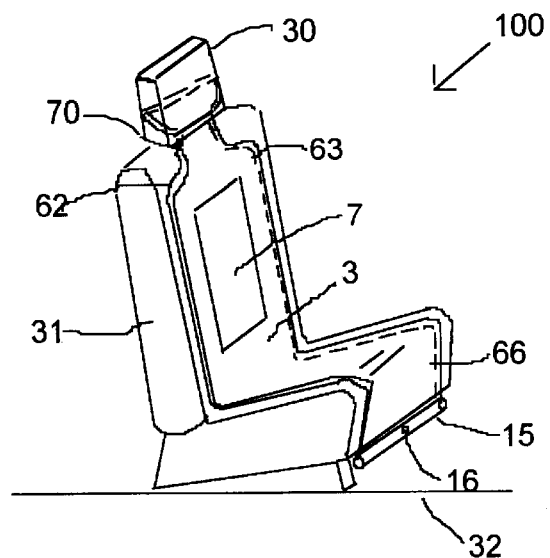
FIG. 1 is a perspective view of a retractable seat cover applied to an automotive seat with a protective fabric fully exposed.

The present invention maximizes the efficiency of providing short term upholstery protection to an automobile seat or furniture by applying a protective barrier on an as needed basis. Referring now to the drawings wherein the showings are for the purpose of illustrating a preferred embodiment of the invention only and not for the purpose of limiting the same, FIG. 1 shows a retractable seat protection cover 100 having a completely extended protective fabric 3 providing a barrier between a standard automotive seat 31 and a potentially contaminating passenger or object that may rest on the seat. The retractable seat cover 100 includes a housing 15, the fabric 3, a strap 70, and a retraction mechanism, such as a spring roller mechanism 40.

Figure 2:
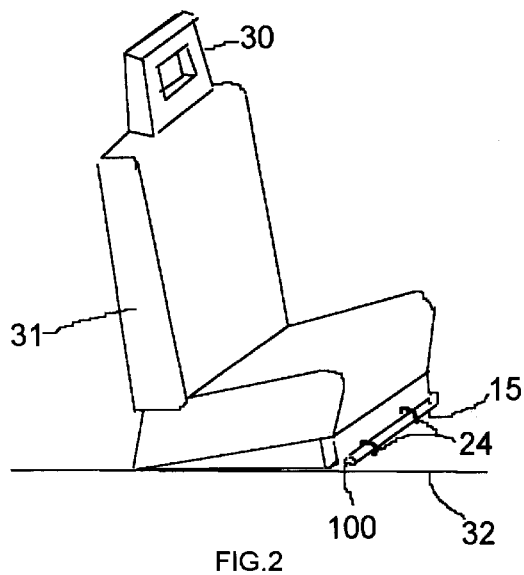
FIG. 2 is a perspective view of the retractable seat cover in a fully stored horizontal position under a seat, without any protective fabric exposed.
Figure 3:
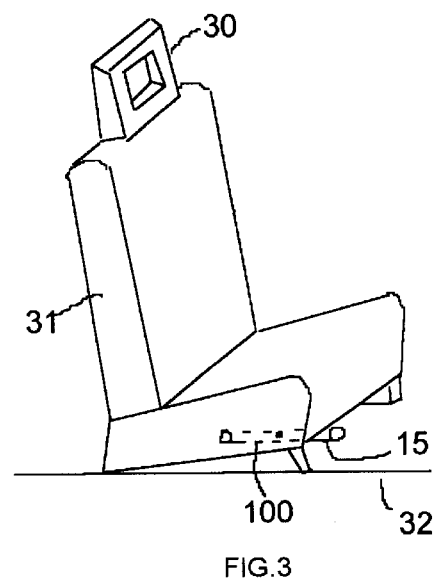
FIG. 3 is a perspective view of the retractable seat cover in a fully stored perpendicular position under the seat, without any protective fabric exposed.
Figure 4:
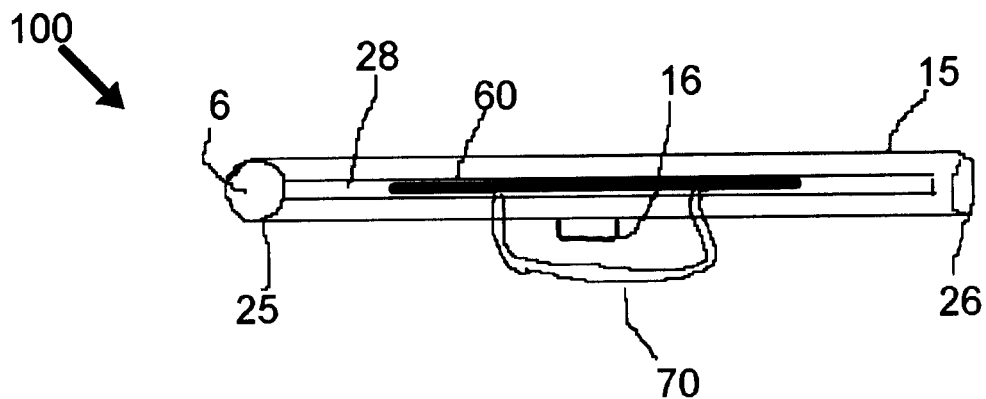
FIG. 4 is a frontal perspective view of the retractable seat cover with the protective fabric fully concealed within a housing.

The discrete and compact housing 15 contains both the fabric 3 and the retraction mechanism so that the retractable seat cover 100 may be stored conveniently within the cabin of a wide array of automobiles, regardless of variations to cabin configurations. FIGS. 2 and 3 demonstrate two common positions that may be utilized by users to store the housing 15 and its contents on a floor 32 of the vehicle until it is ready to be used to protect the automobile seat 31.

FIG. 2 demonstrates the retractable seat cover 100 stored in a direction perpendicular to the seated user, allowing the retractable seat cover 100 to be completely stowed under the seat 31 and providing maximum concealment. FIG. 3 demonstrates how the retractable seat cover 100 may rest comfortably under the seat 31 in a horizontal direction. In this storage position, the retractable seat cover 100 is tucked just under the seat 31 so that it is not readily visible to the user or passengers. Furthermore, the seat cover 100 can be sufficiently pushed under the seat 31 so as to not take up foot space in the cabin of the vehicle. In many cases, there may be an obstruction residing just in front of the housing 15 in this position to prevent rolling and movement. The obstruction may be provided by a natural bump that commonly occurs in this area or the end of the vehicle floor mat which may create a lipped obstruction. In some cases, where the floor is found to be perfectly flat and free of movement inhibiting obstructions, the user may find it worthwhile to utilize commonly available fasteners 24. The fasteners 24, such as fibrous adhesive patches a marketed under the tradename Velcro™, a clip, or the like, may be constructed of any type of material, such as metal, plastic, cloth, or the like, for anchoring the retractable seat cover 100 to the floor surface during periods of non-use. The fasteners 24 may also be used to affix the housing unit 15 to various easy to reach areas that may be available within the cabin which may provide improved accessibility to the seat cover unit 100 without sacrificing discreteness. In order to further encourage discreteness, the housing's 15 exterior color may be consistent with the interior color of the vehicle being protected, thus allowing any minimal surface area that may remain visible to become camouflaged within the interior.

Referring to FIGS. 1–6, the body of the housing 15 is comprised of a rigid elongated cylindrical tubing which is strong enough to maintain a thin wall in order to promote compactness and allow maximum clearance space for the fabric 3 within the tube. The housing 15 has a first end 25 and a second end 26. The inner diameter of the tube or housing 15 is sufficiently large enough to accommodate a roll 2 of protective fabric 3 without threatening the fabric 3 with friction or tearing. The tube or housing 15 allows complete freedom of movement to the internal spring roller mechanism 40 and its adjoining roll 2 with fabric 3. The outer diameter of the tubing or housing 15 is minimized in order to allow the retractable seat cover 100 to be conveniently stored.

There are a wide range of materials that may be appropriate for the housing unit 15, all of which must consider exposure to varying degrees of temperature and humidity in order to maintain a uniform shape, size and strength. Material utilized in the housing 15 must be able to withstand wide temperature variations considering that the retractable seat cover 100 will be commonly stored, maintained and utilized within a vehicle where exposure to direct sunlight may generate increasingly intense heat conditions. Furthermore, vehicles found in colder climates may expose the unit to sub freezing temperatures. In some cases, it may be appropriate to utilize materials that are either available in different colors or able to be painted a variety of colors.

The housing 15 has a straight lateral slit 28 across the housing tube with sufficient space to provide access to the protective fabric 3 from within the housing 15. The slit 28 is sized and positioned for enabling the fabric 3 to extend and retract through the slit 28 during use of the retractable seat cover 100. Preferably, the slit 28 is open at one of the first and second ends 25 or 26 to allow for easy installation of the roll 2 with simultaneous exposure to the fabric 3. Alternatively, the slit 28 may extend only partially between the first and second ends 25 and 26 being closed at each end 25 and 26, or may be open at both of the ends 25 and 26. The housing material must be sufficiently rigid to maintain the thickness and shape of the slit 28 when slight pressure is applied from the users grip surrounding the housing 15 during use. The slit 28 may be prepared with varying degrees of smoothness and angles which enable the fabric 3 to flow through the slit 28 with increased ease. The housing material utilized must avoid friction or abrasiveness which can expose the protective fabric 3 to snagging or tearing.

The spring roller mechanism 40, which is rotatably mounted within the housing 15, may be any suitable type of retraction mechanism for winding and unwinding the roll 2 of fabric 3. As one example, the spring roller mechanism 40 includes a spring roller core body 1 which is a cylindrical housing having a first end 43 and a second end 44. The spring roller core body 1 may be constructed of glued and compressed paper, light metals, fiber reinforced plastics, or any other suitable type of material. A core cartridge 2 or roll is an elongated cylindrical sleeve which may be slid onto the core body 1. The fabric 3 is wrapped around the roll 2 and preferably, a lower portion 66 of the fabric 3 is attached thereto. The roll 2 is secured to the core body 1 by pins 14. The spring roller mechanism 40 further includes a shaft holder plug 4. The shaft holder plug 4 is a plastic injection molding plug which is housed within the core body 1 and holds a rotating shaft 20 centered.

Each end of the housing tube 15 is capped with a piece of material that is complementary to the housing material. The first open end 25 is closed with a first cap 6, which may be fixed and permanently secured to the housing 15 with an ergonomically correct smooth finish on the exterior of the housing 15. The cap 6 has an inside concave surface 36 for providing a funneling affect leading towards a depository hole 38 for the spring roller shaft 20 located at a far end of a spring roller mechanism 40. The funneling effect is intended to gently guide the spring roller shaft 20 correctly into place during the installation of a new roll 2 of fabric 3.

Figure 6:
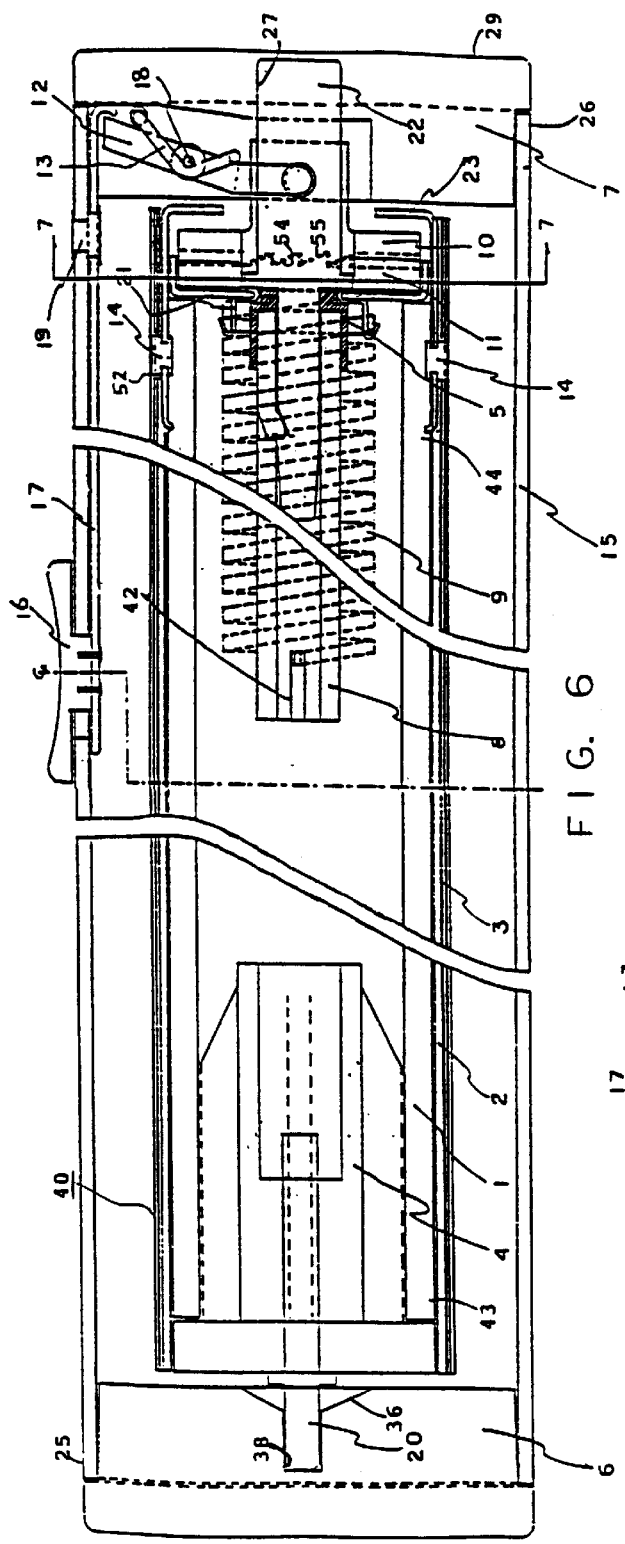
FIG. 6 is a view of the retractable seat cover revealing an internal structure of the retractable seat cover.
Figure 7:
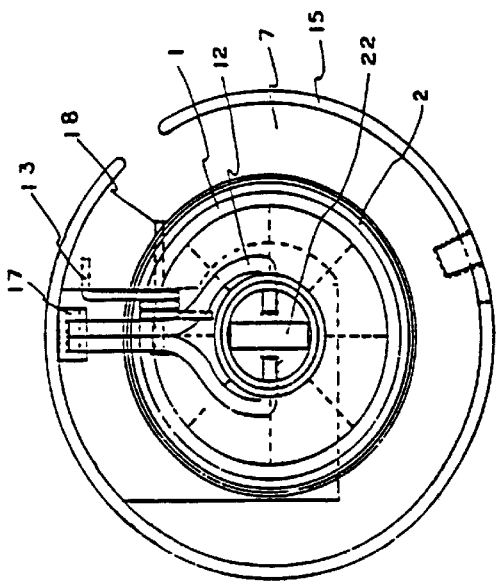
FIG. 7 is a view taken along line 7—7 of FIG. 6.

The opposite open end 26 has a second end cap 7, which may be removable and is connected to the spring roller core 1 in a manner which provides sufficient play to allow the spring roller mechanism 40 to function correctly. The spring roller core 1 may be affixed to the end cap 7 in a variety of ways such as is depicted in FIG. 6, as well as others. In FIG. 6, a lateral slot 27 is engraved down the center of the inside area of the end cap 7 to act as a loose receptacle for a metallic tab 22 protruding from the spring roller mechanism 40. The slot 27 does not penetrate the exterior surface 29 of the end cap 7 so it is not revealed to the outside of the cap 7. The removable end cap 7 is thus designed to remove the spring roller mechanism 40 and its core 1 as one unit during installation, removal and/or replacement of a roll 2 of protective fabric 3.

As an alternative to the end cap 6 being fixed and the end cap 7 being removable, the end cap 6 may be removable and the end cap 7 may be fixed. For this embodiment, the end cap 6 is removed from the housing to open the end 25 of the housing 15. The roll 2 of fabric 3 alone is removed from the housing 15 and a new roll of fabric 3 may be slid into the housing 15 for replacing the fabric 3.

A spring core 8 is a tube for receiving a torsion spring 9 and a tab shaft 22. The spring core 8 may be a hard plastic or any other suitable type of torsion resistant material. The torsion spring 9 is secured to one end of the spring core 8 by inserting an end of the torsion spring 9 into a slot 42. A bushing 5 is secured to an opposite end of the spring core 8. The bushing 5 may be a nylon bearing bushing or any other friction resistant material. Preferably, the bushing 5 is a cap bushing molded in nylon and having a slot in its center so that one end can be crimped over the body of the tab shaft 22 and a circular bell-like at the other end to receive the spring core end. The bushing 5 serves as a friction reducer bearing between the spring core 8 and the retaining cap 21.

The retractable seat cover 100 includes a slidable release switch 16 attached to the housing 15 for controlling or releasing the spring mechanism 40. The switch 16 floats freely within a cavity on an outside of the housing 15. When the switch 16 is not activated, spring tension is refrained from acting upon the roller mechanism 40. To activate the spring tension so that the fabric 3 can be rolled back into the housing 15, the user must slide the release switch 16, which removes a braking mechanism. The switch 16 may be a slidable switch, a push button switch, or any other suitable type of switching device.

The braking mechanism includes an upper stop bushing 10 and a lower stop bushing 11. The bushings 10 and 11 have a series of sawtooth slopes surrounding the periphery of the bushing 10 and 11. The bushings may be formed of plastic, metal, or the like. When the two bushings 10 and 11 are together, the sawtooth portions 54 and 55, respectively, are mateably connected together, creating a braking mechanism. As an alternative to the use of the bushings 10 and 11, any other suitable type of braking mechanism may be used to control rotation of the roll 2 of fabric 3.

The lower stop bushing 11 is fastened to a retaining cap 21 by rivets, glue or other suitable means. The retaining cap 21 is a two piece metal component. The lower end includes a bell-shaped structure that encapsulates the nylon bearing bushing 5 and has two protruding hooks extended at the end to receive the last two or three spring coils 9 wrapped around the cap 21. The torsion spring 9 may be a flat spring material wound loosely around the spring core 8 and fastened by means of a bend at the end of the spring 9, which is inserted into the slotted end 42 of the core 8. The opposite end of the spring 9 has a peripheral bend on the last coil which is crimped by the receiving hooks protruding from a retaining cap 21.

The upper stop bushing 10 is attached to a wishbone lever 12, or any other suitable type of lever. The lever 12 is a two part lever that pivots on a pin 18 and has two bends at an end, which are introduced at assembly into two radial opposed cavities on the outer stop mesh bushing 10. The lever 12 is spring loaded by a spring 13, which may be a lateral tension spring made out of round spring material. The spring 13 keeps tension on the outer stop mesh bushing 10 and releases the tension when the switch 16 is activated. The spring 13 also pivots on the pin 18. The pin 18 may be pressure fit into the wall of the end cap 7.

The switch 16 is attached to a connector shim 17 which is positioned on the inner surface of the housing 15. An opposite end of the connector shim 17 is attached to the lever 12. The connector shim 17 is guided and maintained by a shim guide 19, which is attached to the housing 15. When the switch 16 is activated, the connector shim 17 moves, which moves the lever 12, which separates the upper bushing 10 from the lower bushing 11 and releases the braking mechanism, which allows rotation of the spring core 8.

As an alternative, the switch 16 may be directly attached to the bushing 10, or may be attached to the connector bar or shim 17, which is attached to the bushing 10. For this embodiment, the lever 12 may be eliminated.

A core cap 23 is a cap that covers the end of the core body 1 and has an opening to allow an end of a tab shaft 22 to extend therethrough. The cap 23 may be secured, such as by crimping, to the core body 1. The core cap 23 has two guide pins 14 peripherally located at opposite sides on the outside of the cap 23. The pins 14 may be riveted in place to receive the cartridge or roll 2. The pins 14 are shoulder pins that hold in place the core cartridge 2 and substantially avoid any lateral movement independently from the core 2. The pins 14 allow the cartridge 2 and the core 1 to move together as one unit.

The core body 1 and core cartridge 2 rotate as one unit by the spring roller spear 20 inserted into the depository hole 38 in the end cap 6 and by the tab shaft 22 inserted into slot 27 in end cap 7. The tab shaft 22 is a metallic plate inserted into one end of the spring core 9, which is held crimped on its side and has a shoulder to hold it at the proper depth within the core 9. The tab shaft 22 remains fixed within both the end cap 7 and the spring core 9, rotational movement occurring around the tab shaft 22 and nylon bushing 5.

As an alternative to the use of the switch or sliding button 16, centrifugal force may be used to activate the counterweight mechanism which locks and unlocks traditional spring rollers.

An anchoring mechanism may be attached to the fabric 3 for providing a means for supporting the top portion 63 of the fabric 3. The anchoring mechanism may be the bar 60, the bar 60 and strap 70, or the like. The rigid thin lateral bar 60 is connected to the end of the fabric 3 and is secured and centered across the width of the top end 63 of the fabric 3. The bar 60 may be a cylindrical bar, a rod, or any other suitable type of longitudinal member. As one example of securing the fabric 3 to the bar 60, the fabric 3 may be folded over and attached to itself, such as by stitching, adhesively or the like, for providing a pocket 61 for slidably receiving the bar 60 therein. The bar 60 can be made slightly shorter than the full width of the fabric 3 in order to allow the fabric 3 to be concealed when in use just above the shoulder area of the user. The shorter length also allows the fabric 3 to be cut and contoured at the top for providing a contoured portion 62 so that the fabric 3 more closely fits the actual shape of the automotive seat 31 and adds to the aesthetic appeal and discreteness when the retractable seat cover 100 is in use, as shown in FIG. 1. The bar 60 is intended to be thin and not obvious, however must be thicker than the housing slit 28 in order to avoid the bar 60 passing through the slit 28 and end up residing within the housing 15. The bar 60 is intended to reside permanently just outside the housing 15 during non-use and is the primary source of receiving force from the user to extract fabric from the spring roller 40. The purpose of the bar 60 is to maintain a uniform flat consistency of the fabric during utilization of the spring roller mechanism 40. This will prevent the fabric 3 from folding or bunching up as it moves through the slit 28, inward or outward. The bar 60 also serves as a convenient means of grasping the fabric 3 in a manner that does not interfere with the efficient operation of the spring roller mechanism 40.

A strap 70 is secured to the fabric 3 by attaching the strap 70 to the end of the control bar 60, to the fabric 3, or to combinations thereof. The strap 70 may be a small piece of thin elastic, a piece of material with an adjustable buckle, two separate pieces of material having ends attached together by fibrous adhesive patches marketed under the tradename Velcro, or any other type of suitable fastening means, which serves as the anchoring mechanism between the fabric 3 and the seat 31, specifically around the top portion of a seat, such as the head rest 30, the top of an automobile seat, the top of a piece of furniture, or the like. The strap 70 includes a first end 72, a second end 74, and an elongated portion 75 therebetween. Each of the first and of the fabric 3, preferably in spaced apart relation. The elongated portion 75 forms a loop which may be positioned around the top portion of the seat.

As one example of the securement of the strap 70 to the fabric 3, the pocket 61 may have a first aperture 64 and a second aperture 65. The first end 72 may be inserted through the first aperture 64, wrapped around the bar 60, and secured thereto. The second end 74 may be inserted through the second aperture 65, wrapped around the bar 60, and secured thereto. Alternatively, the strap 70 and bar 60 may be attached to the fabric 3 adhesively, sewn, or by any other suitable manner.

The strap 70 or elastic band stretches enough to surround all vehicle tops, furniture tops, and head rests 30 to allow the invention to be utilized universally across all vehicles and various types and sizes of furniture. FIG. 1 demonstrates the method by which the elastic anchors the fabric to the seat. Although many types of straps 70 will serve the purpose of anchoring, it is preferred that the thickness of the strap 70 is minimized in order to promote discreteness during usage. The strap 70 may be in varying colors so that a camouflaging effect occurs between the strap 70 and the upholstery, further encouraging discreteness.

Figure 5:
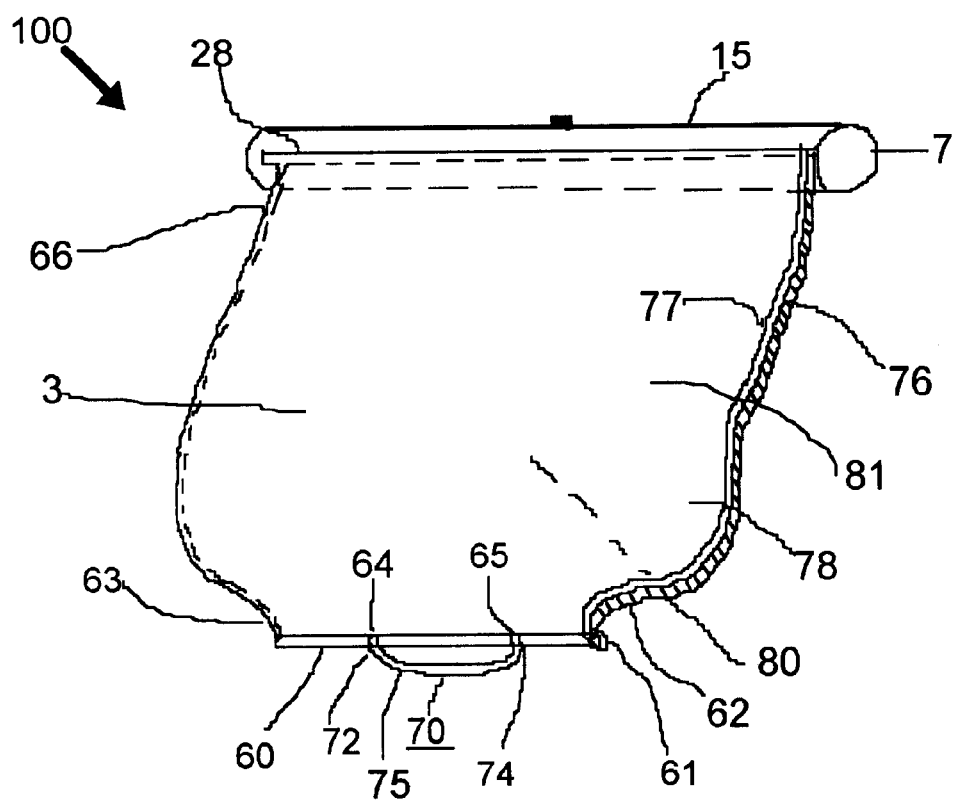
FIG. 5 is a frontal perspective view of the retractable seat cover with the protective fabric partially exposed.

Referring to FIG. 5, in order to provide maximum protection, the fabric 3, in either woven or non-woven form, should have a wide array of properties and may have one or more layers. As an example, a first layer 76 may include a waterproof backing on an underside surface 80 and a second layer 77 may have water resistant properties on a top surface 81. The first layer 76 is positioned adjacent to the seat 31 for preventing moisture from contacting the seat 31. The second layer 77 is positioned facing a user for repelling moisture away from the fabric 3. Also, the fabric 3 may integrate antibacterial technology in its fabrication to further reduce contamination within the vehicle. Protection against bacteria growth is achieved by providing fabric that is impregnated with an antibacterial agent. As an example, the second layer 77 may have an antibacterial surface 78 integrated therewith.

The fabric also offers solar protection from heat and upholstery damaging UV rays when upholstery is exposed to sunlight for a prolonged period of time. The protective fabric is designed to protect furniture and/or automobile seat surfaces from wetness, odor, soilage, UV rays and bacteria which can contaminate or damage surfaces when contacted with the same. The protective fabric is strong enough to be used numerous times yet economical enough to be disposed of and replaced after short term usage in order to further encourage sanitation and discourage the development of odors from prolonged collection of sweat, odor and dirt. The fabric is sufficiently thin to allow the housing unit to be compact.

The fabric 3 may have a design 79, such as a cartoon, logo, or any other type of design to enhance the aesthetic appeal of the cover and/or promote a brand In operation, the user moves the button 16 and pulls on the strap 70 or bar 60 to unroll the fabric 3 and withdraws the fabric 3 from the discrete housing 15 through the slit 28. The strap 70 is positioned around the top portion of the seat 31, which acts as a holder for one end of the fabric 3. The user can then begin to further unwind the spring loaded roller or core body 1 to expose sufficient fabric 3 to cover the desired area of the seat 31. The roller 1 and its housing 15 extend past the edge of the seat 31 in order to fully drape the fabric 3 over the seat's surface and the housing 15 may be positioned on the floor 32 of the vehicle or a floor of a room. Utilization of the head rest or top of the seat as the primary anchor allows the retractable seat cover 100 to be universally used since most vehicles use a head rest as a common component in automotive seating. The spring roller mechanism 40 controls the availability of the fabric 3. Upon completed use, the user can activate the roller 1 by pressing the button 16 in order to allow the roller 1 to collect the exposed fabric 3 back into the discrete roller housing 15 for future use. The fabric 3 is wound back onto the roller 1 until the bar 60 contacts the housing 15.

To replace the roll of fabric 3, if the end cap 7 is the removable end, then the end cap 7 is removed, along with the roll 2 of fabric 3, the core 1 and the spring mechanism 40, from the housing 15. The user may remove the used and expired roll 2 of fabric 3 by sliding it off of the roller core 1 in a lateral direction away from the end cap 7 until it is completely removed from the spring roller core 1. A new roll 2 of fresh fabric 3 may then be installed by laterally sliding the new roll 2 of fabric 3 laterally over the exposed end of the spring roller core 1 towards the end cap 7 until the end of the roll 2 reaches the end of the core 1. As illustrated in FIG. 6, the core of the roll 2 of protective fabric 3 is designed in a manner which insures that the spring roller core 1 and fabric core 2 will unite together so that the dispensing of fabric 3 from the roll 2 is under the direct control of the spring roller mechanism 40. This can be accomplished using pins 14 or other means which protrude from the spring roller core 1 to connect firmly to slots 52 in the fabric roll 2 as depicted in FIG. 6. Upon correct installation of the fabric roll 2 to the spring roller core 1 and end cap unit 7, the user can re-install the entire unit (including removable end cap 7, the spring roller mechanism 40 and the fabric roll 2 with the fabric 3) into the housing unit. This is accomplished by sliding the combined unit into the housing 15 with a sliver of fabric 3 revealed through the housing slit 28.

If the end cap 6 is the removable end, then the end cap 6 is removed and the expired roll 2 of the fabric 3 is slid off of the core 1 and out of the open end 25. The other components of the seat cover 100 remain within the housing 15. A new roll 2 of fabric 3 is slid onto the core 1 and may be engaged with the pins 14 or other means for securing the roll 2 to the core 1. The fabric 3 is fed through the slit 28, and the end cap 6 is replaced.

An advantage of the retractable seat cover 100 is that the retractable seat cover 100 provides a convenient discrete method of providing short term re-usable protection to upholstery surfaces, so car owners and furniture owners can substantially reduce the levels of pollutants contaminating the surfaces of their upholstery. The need for vehicle or furniture owners to use expensive disinfectants, odor fighters or permanent seat covers to correct damage done over time is eliminated.

Another advantage is that the retractable seat cover 100 allows the upholstery to be temporarily covered, offering an alternative to permanent seat covers. Most car owners prefer the aesthetic appeal of original upholstery.

Since automotive seat configurations vary widely from vehicle to vehicle, the retractable seat cover 100 provides a temporary seat cover that is universal in fit. The use of an elastic band that can be easily wrapped around the top portion of a seat enables the seat cover to be used on various styles of automobiles, including those that may not have mounting bars available. Additionally, the use of a contoured top end of the fabric 3 allows for maximum surface area coverage which provides substantially full coverage to the exposed area of the upholstery.

Yet another advantage is the use of fabric impregnated with an antibacterial agent for providing antibacterial protection on the automotive seats, which can be exposed to a wide array of bacteria from sweat, dirt and other contaminants. Also, the fabric incorporates water repellent or waterproof properties in order to maximize protection.

Yet another advantage is that the retractable seat cover 10 offers a semidisposable solution which allows the user longer usage intervals and discrete storeability that make ongoing usage both practical and sanitary.

The compactness of the apparatus allows easy storage under the seat or can be conveniently attached within arms length utilizing commonly available fasteners (i.e. fibrous adhesive patches marketed under the tradename Velcro). The apparatus provides the convenience of easy application of temporary protection without the need to store a loose and/or bulky covering which can be inconvenient or impractical, thus allowing the user to enjoy the natural beauty of the unprotected surface during periods when soilage is unlikely. The discreteness of the apparatus and its housing allows a user to comfortably install and store the apparatus without concern that it may detract from the aesthetic appeal of a vehicle or furniture.

Thus there has been shown and described a novel retractable seat protection cover which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

I claim:

1. A retractable seat cover for providing temporary protection to a seat having a top portion, comprising:

a housing having a first end; and a second end, the housing being a self-contained, compact unit for enabling the retractable seat cover to be transferred to different seats;

a spring loaded retraction mechanism removably positioned within the housing and rotatably attached between the first and second ends of the housing;

a braking mechanism coupled to the sprint loaded retraction mechanism and positioned between the first and second ends of the housing for controlling rotation of the prints loaded retraction mechanisms;

a fabric having a top portion and a lower portion, the fabric attached to the removable retraction mechanism for enabling the fabric that is used to be replaced with a fabric that is new for prolonging useful life of the seat cover, and the top portion extending from the housing as the fabric is withdrawn from the housing during use of the retractable seat cover and retracting back into the housing when the retraction mechanism is activated by releasing the braking mechanism to roll the fabric back into the housing during non-use of the retractable seat cover; and a strap having a first end and a second end, the first and second ends coupled to the top portion of the fabric, the strap positionable around the top portion of the seat for anchoring the retractable seat cover to the seat.

2. The retractable seat cover according to claim 1, further comprising a bar secured to the top portion of the fabric, the bar is sized and positioned for residing outside of the housing and enabling a person to grasp the bar for pulling the fabric out of the housing and serving as a stop for controlling retraction of the fabric back into the housing.

3. The retractable seat cover according to claim 1, wherein the fabric has a contoured portion which is cut and tapered for conforming to the top portion of the seat of an automobile for improving aesthetic appeal.

4. The retractable seat cover according to claim 1, wherein the fabric contains anti-bacterial properties which help prolong usable life of the fabric and substantially reduces bacteria growth and odors on the fabric.

5. The retractable seat cover according to claim 1, wherein the fabric includes a first layer having waterproof properties, the first layer being in direct contact with the seat for substantially reducing moisture from coming into contact with the seat.

6. The retractable seat cover according to claim 1, wherein the fabric includes a second layer having moisture repellent properties, the second layer being in contact with a user or the retractable seat cover for encouraging moisture to remain with the user.

7. The retractable seat cover according to claim 1, wherein the retraction mechanism comprises:
   a spring positioned within the housing;
   a lower bushing coupled to the spring;
   an upper bushing mateably engagable with the lower bushing for controlling movement of the spring;
   a switch attached to the housing; and
   a lever coupled to the switch and coupled to the upper bushing for separating the upper bushing from the lower bushing for releasing the spring for allowing the retraction mechanism to rotate to control rotation of the fabric into the housing.

8. The retractable seat cover according to claim 1, wherein the fabric has a design for enhancing an aesthetic appeal of the retractable seat cover.

9. The retractable seat cover according to claim 1, further comprising:
   an anchoring mechanism securable to the fabric; and
   a pocket positioned at the top portion of the fabric for slidably receiving the anchoring mechanism.

10. The retractable seat cover according to claim 1, wherein the strap is elastic for enabling the seat cover to be used on numerous types of seats.

11. The retractable seat cover according to claim 1, wherein the retraction mechanism comprises:
   a spring roller core body positioned and rotatable within the housing and having a first end and a second end;
   an elongated cylindrical sleeve slidable onto the spring roller core body;
   the fabric wrapped around and secured to the cylindrical sleeve;
   the housing having a hole in the first end and a slot in the second end;
   a roller shaft coupled to the first end of the spring roller core body and rotatable within the hole in the first end of the housing;
   a tab shaft coupled to the second end of the spring roller core body and positioned within the slot in the second end of the housing; and
   a spring coupled to the tab shaft for providing tension to the retraction mechanism for rotating the spring roller core body to wind and unwind the fabric on the cylindrical sleeve.

12. The retractable seat cover according to claim 11, wherein the housing further includes:
   a first end cap attached to the first end of the housing, the first end cap having the hole of the housing and having a concave portion for guiding the roller shaft into the hole;
   a second end cap attached to the second end of the housing and having the slot; and
   at least one of the first and second end caps removable for enabling a new piece of fabric to be installed within the housing.

13. A retractable seat cover for providing temporary protection to a seat having a top portion, comprising:
   a housing having a first end and a second end, the housing being a self-contained, compact unit for enabling the retractable seat cover to be transferred to different seats;
   a retraction mechanism removably positioned within the housing and rotatably attached to the first and second ends of the housing;
   a piece of fabric having a top portion and a lower portion, the fabric attached to the removable retraction mechanism for enabling the fabric to be replaced, and the top portion extending from the housing as the fabric is withdrawn from the housing during use of the retractable seat cover and retracting back into the housing when the retraction mechanism is activated to roll the fabric back into the housing during non-use of the retractable seat cover;
   a bar removable coupled to the top portion of the fabric, the bar is sized and positioned for residing outside of the housing and enabling a person to grasp the bar for pulling the fabric out of the housing and serving as a stop for controlling retraction of the fabric back into the housing; and
   a strap having a first end, a second end, and an elongated loop portion therebetween, the first end and the second end positioned in spaced apart relation to one another having the first end of the strap secured at a first position on the bar and the second end of the strip secured at a second position on the bar, the elongated loop portion of the strap expandable about the top portion of the seat while the first and second ends remain attached to the bar for removably securing the strap to the top portion of the seat for anchoring the retractable seat cover to the seat.

14. The retractable seat cover according to claim 13, wherein the fabric has a contoured portion which is cut and tapered for conforming to a shape of the seat of an automobile for improving aesthetic appeal.

15. The retractable seat cover according to claim 13, wherein the fabric includes a first layer having a waterproof barrier on an underside surface for contacting the seat for substantially reducing moisture from coming into contact with the seat.

16. The retractable seat cover according to claim 13, wherein the fabric includes a second layer having moisture repellent properties on a top surface for contacting a user of the retractable seat cover for encouraging moisture to remain with the user.

17. A retractable seat cover for providing temporary protection to a seat having a top portion, comprising:

an elongated housing having a first end, and a second end, the housing being a self-contained, compact unit for enabling the retractable seat cover to be transferred to different seats;

a retraction mechanism removably positioned within the housing and rotatably attached to the first and second ends of the housing;

a piece of fabric having a top portion and a lower portion, the fabric attached to the removable retraction mechanism for enabling the fabric to be replaced, and the top portion extending from the housing as the fabric is withdrawn from the housing during use of the retractable seat cover and retracting back into the housings when the retraction mechanism is activated to roll the fabric back into the housing during non-use of the retractable seat cover;

the fabric having a first layer with waterproof properties, the first layer being in direct contact with the seat for substantially reducing moisture from coming into contact with the seat;

the fabric having a second layer with moisture repellent properties, the second layer being in contact with a user of the retractable seat cover for wicking moisture away from the fabric and repelling moisture toward the user for encouraging moisture to remain with the user, the second layer of the fabric impregnated with antibacterial agents which substantially reduce bacteria growth and odors on the fabric for prolonging usable life of the fabric; and a strap having a first end and a second end, the first and second ends coupled to the top portion of the fabric, the strap positionable around the top portion of the seat for anchoring the retractable seat cover to the seat.

18. The retractable seat cover according to claim 17, further comprising:

a roller body rotatably attached to the housing;

a pin attached to the roller body; and the roll having at least one slot mateably engagable with the pin for connecting together the roller body and the roll of fabric.

19. The retractable seat cover according to claim 17, wherein the strap is elastic for enabling the seat cover to be used on numerous types of seats.

* * * * *